Patented Nov. 21, 1922.

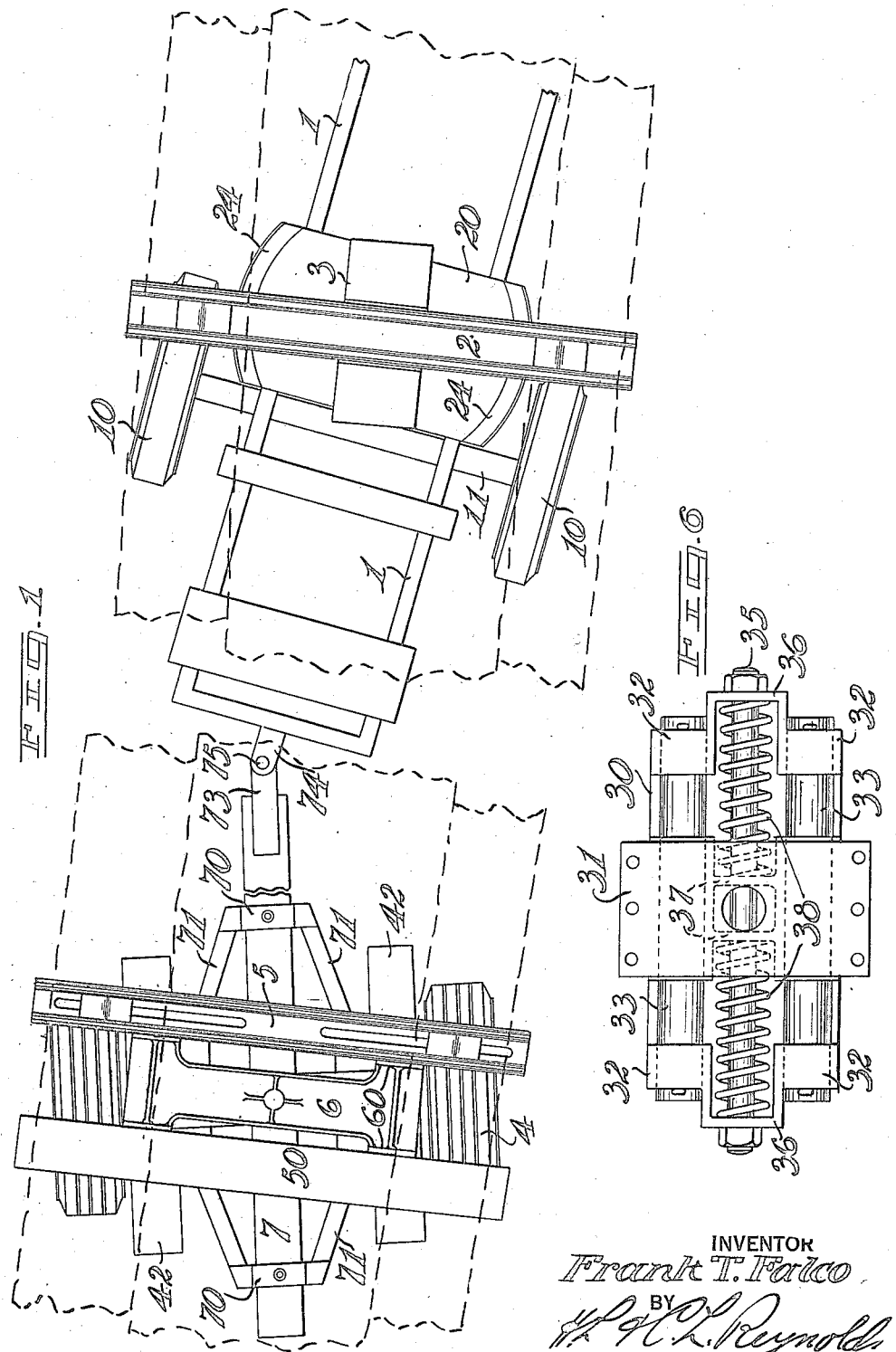

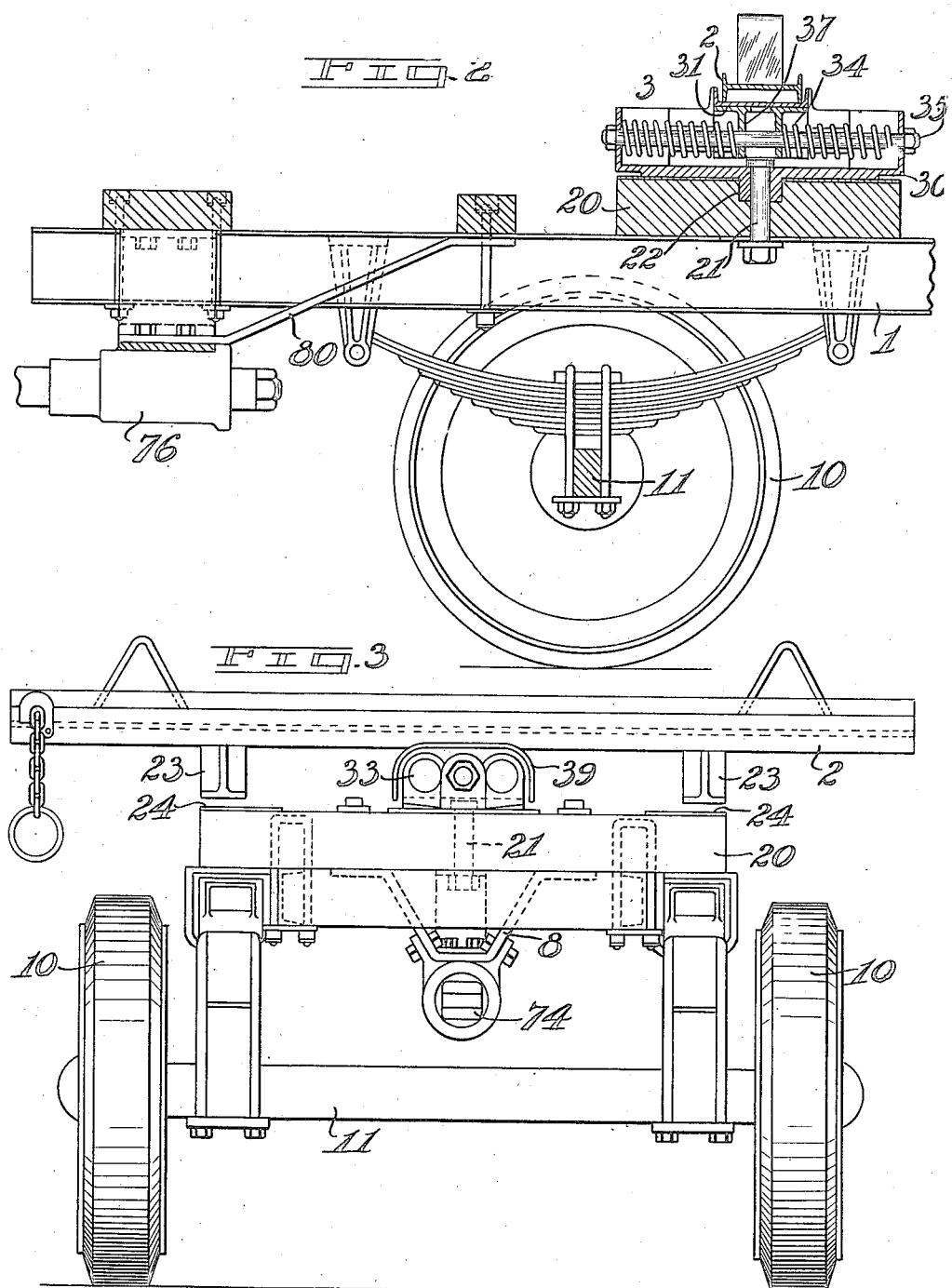

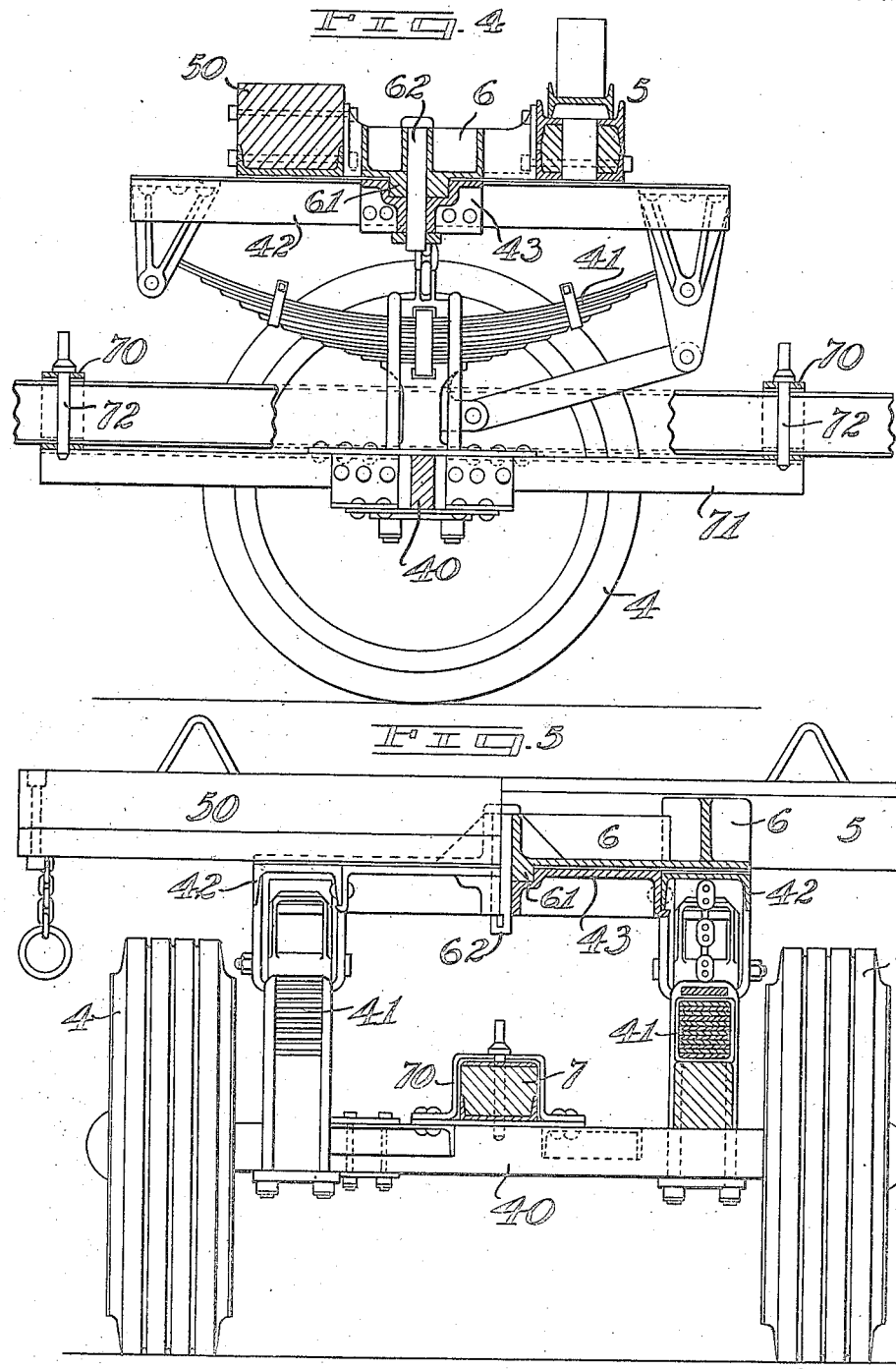

1,436,025

UNITED STATES PATENT OFFICE.

FRANK T. FALCO, OF SEATTLE, WASHINGTON, ASSIGNOR TO PACIFIC CAR & FOUNDRY CO., OF SEATTLE, WASHINGTON, A CORPORATION OF WASHINGTON.

SEMITRAILER AND MEANS FOR CONNECTING IT WITH A TRUCK.

Application filed December 29, 1920. Serial No. 433,902.

*To all whom it may concern:*

Be it known that I, FRANK T. FALCO, a citizen of the United States of America, and resident of the city of Seattle, in the county of King and State of Washington, have invented certain new and useful Improvements in Semitrailers and Means for Connecting Them with Trucks, of which the following is a specification.

My invention relates to a combination of a truck and trailer which is designed more particularly for carrying long and heavy articles wherein the draft on the trailer is through a reach and not through the load. One of the uses for which it is intended is in the hauling of logs, (although it is equally well adapted for hauling other articles, as structural steel,) which are of considerable length and particularly where they may be supported by two bunks or sets of bunks separated a considerable distance, one upon the truck and the other upon the trailer.

The peculiar features of construction also apply to cases wherein a load carrying platform or body is supported upon bunks or an equivalent therefor.

The object of my invention is to provide a truck and trailer construction and means for connecting them, such that the troubles which have heretofore arisen in the use of such a combination, particularly when passing about curves or corners, may be corrected.

Other objects of my invention may be seen from a study of the following description and the claims terminating this specification.

The features of my invention which I believe to be new and upon which I desire to obtain a patent will be particularly defined in the claims.

In the accompanying drawings I have shown my invention embodied in the type of construction which is now preferred by me.

Figure 1 shows in plan view the rear end of a tractor-truck and the wheels and bunk portions of a semi-trailer, that is a trailer having two wheels and upon which is mounted the type of bunk construction employed in this invention.

Figure 2 is a side elevation showing the rear end of the tractor-truck with the bunk mechanism in section.

Figure 3 is a rear end elevation of such a truck with the bunk mounted thereon.

Figure 4 is a sectional side elevation taken upon the central plane of the trailer.

Figure 5 is a fore-and-aft end view of the trailer, one side thereof being in section.

Figure 6 is a plan view of the sliding mount for the bunk which is mounted upon the truck.

In the use in connection with trucks, of semi- or two-wheel trailers having a draft reach such as herein shown, considerable difficulty occurs unless the bunk and the pivot connection of the reach with the truck, are both located in the same vertical plane as the rear axle of the truck, and also with the reach connection on a level with the bearing top of the bunk. When this condition does not exist, turning of the truck out of alinement with the trailer reach, as in turning corners, will shorten the distance between the bunks, thus tending to slide the load over one bunk. The vertical separation of the point of connecting the reach to the truck and the top of the bunk, has the same effect when the horizontal plane of the truck is changed relative to the horizontal plane of the trailer reach.

It has been found difficult to secure the reach which forms the draft member of the trailer, at a point which measurably conforms to the conditions above defined and whenever the connection of the reach to the truck is located either forwardly or rearwardly at any considerable distance from the rear axle, whenever the truck swings out of exact alinement with the trailer and its reach, the distance between the bunks of truck and trailer is shortened.

This shortening of the distance between the bunks, whatever the amount, can only be accommodated either by slight distortion of the springs of the trailer which can, however, act only to a small extent, or by a sliding of the logs upon one or both of the bunks. Due to this fact logs carried by such a truck-trailer combination are often forced off in making turns.

In addition to the above objections another objection arises, namely, a truck is designed to carry a part of its load upon the front wheels and not altogether upon the rear wheels. If the bunk is placed immediately over the rear axle, which has been the custom in devices of this sort, none of the load carried by the truck is carried by the front wheels of the truck and, therefore, the carrying capacity of the truck is not equal to that for which it has been designed and is capable. It is, therefore, desirable, if this be feasible, to mount the bunk forwardly of the rear axle. This result I have secured in the present invention by providing means whereby the bunk may have a bodily movement in the direction of the length of the truck, so as to accommodate the differences in distance between the bunks of the truck and the trailer.

In Figure 1, 1 represents the chassis of a tractor-truck and 10 the rear wheels thereof. The position of the rear axle is shown at 11. Forwardly of this is a bunk 2. Secured to the chassis is a bunk base 20 and upon this, mounted on the central axis of the truck, is a turntable and sliding mechanism 3, by which the bunk is supported from the bunk base 20.

This turntable and sliding mechanism is shown separate from other parts in plan view in Figure 6. It is also shown in longitudinal sectional elevation in Figure 2. This comprises a base frame 30 and a sliding member 31. The base member 30 has ears 32 at each end arranged in pairs one at each side of the central line. These form supports for guideways, as bars 33, which are supported above the bottom plate of the member 30.

The sliding member 31 has downwardly extending ears 34 which are bored to snugly fit over the guideway or bars 33. This permits the slide 31 to be reciprocated lengthwise of the device. On the central axis of these two members 30 and 31 is mounted a rod 35 which is carried in webs 36 which connect the two ears 32. The slide 31 has ears 37 extending downwardly and bored to receive the rod 35. Surrounding this rod and bearing against the web 36 at one end and the ears 37 at the other, are two helical springs 38. These form draft springs and act to hold the slide in a central position while permitting it to be moved towards either end. These parts I prefer to cover by a shield, as 39, which is shown in Figure 3, thereby keeping dirt out of these parts.

The lower plate 30 of this turntable device is secured to the bunk base 20 by means of a king pin 21 which passes through both of these parts and also by a circular boss 22 which is an integral part of the base 30 and extends into a complemental recess in the bunk base 20.

The trailer which is used in connection with the truck as above described is also provided with bunks which are mounted upon a central vertical axis so as to swing to conform with the swinging of the bunk upon the truck. The trailer described is one which has two wheels 4 mounted upon an axis 40. It is also preferably provided with springs as 41, located just inside of each wheel. Above each of the springs is a beam 42 and these beams are centrally connected by a transverse beam or casting 43, thus forming a rigid frame which is yieldingly supported by the springs. The springs and other supporting mechanisms for this frame are elevated sufficiently to carry the top surface of the frame well above the level of the wheels.

Mounted upon this frame are a pair of bunks 5 and 50 these being separated in a fore-and-aft direction so as to form a broad base for the support of the logs or other load being carried. By employing a broad base of this character secured by two separated bunks, I provide means whereby the rocking tendency or rotative torque about the axle which would be caused by a tractive effort exerted through the load being carried on the bunks, would not be as great as if there were a single bunk mounted directly over the axle. Any considerable tractive effort exerted upon the bunk would tend to transfer more of the load carried to one or the other of the bunks, being the one which is located rearwardly with reference to the direction of action of the draft, and would thus act to cause the wheels to be moved to correspond.

The two bunks 5 and 50 are connected by a casting 6. This casting has its ends located over the side beams 42 of the bunk supporting frame. It is provided at its ends with flanges, as 60, by which it is secured to the two bunks. It also has a boss, as 61, which enters a complemental recess in the casting or beam 43 which connects the two side beams 42. A king pin, or bolt 62 passing through two parts 6 and 43 bind the two together. The compound bunk thus formed is permitted to swing about its axis as may be necessary. The two bunks are provided with side bearings upon each of the side beams 42. The bunk 2 carried by the truck is also provided with side bearing blocks, as 23, which are positioned to engage with plates 24 carried by the bunk base 20 and thus serve as side bearings.

It will be noted that the bunk carried by the truck is forwardly of the rear axle of said truck. The trailer is connected with the truck through the means of a reach 7 which is mounted in guides 70 carried by the hounds 71 of the trailer. Pins, as 72, permit adjustment of the reach so that the trailer may be coupled to the truck, short or long as desired.

The reach at its forward end is provided with a bar 73 which is adapted to enter a yoke or clevis, as 74, carried by the truck chassis. The two are secured together by a pin 75. The yoke 74 by which connection is made, is mounted to have a reciprocating movement within a casing 76 in which is a spring, whereby a yielding draft connection is made. This device is of an ordinary or standard construction and, while its use serves to secure somewhat a yielding between the truck and the trailer, which, in a measure, accommodates for the difference in direct distance between the bunks when the combination is rounding a curve, its details of construction are, however, hardly thought to be new. It is supported from the chassis by means of a yoke 8 and a brace bar 80. It is located beneath the level of the chassis and at the extreme rear end thereof.

With a load of logs upon a truck and trailer constructed and connected as just described, the forward bunk, or that carried by the truck, is free to move within certain limits in a fore-and-aft direction and thus will accommodate for the irregularities of separation caused in turning. At the same time the yielding connection of the truck with the trailer through the draft device contained within the casing 76, will also accommodate for this to a certain extent. In addition I find these two yielding members, namely, the sliding bunk and the sliding draft connection, serve to facilitate starting of a heavy load under certain conditions. It permits the truck to get under way before actual starting of the trailer and the load and thus greatly facilitates starting. This action is one which is well understood by the operators of trucks and also of locomotives.

The term "bunk" as herein used both in the specification and claims, is intended to cover any member such as a bolster which is used to support the load or to support a floor, body, platform, or frame upon which is placed the load. It is evident that a platform body or frame might be mounted upon the bunks, or their equivalents, and thus adapt the device for handling package freight or loose material in bulk.

What I claim as my invention is:

1. In a trailer, in combination, an axle, springs mounted upon said axle just within the wheels, a fore-and-aft beam supported upon each spring and normally extending above the top of the wheels, a frame rigidly connecting said beams and having the lower half of a pivoted bunk bearing, two transverse bunks, a frame centrally connecting said bunks to maintain them in separated relation and having the complemental part of said pivoted bunk bearing.

2. A two wheeled trailer having a bunk supporting frame having its upper surface normally above the wheel tops and having a bunk pivot and side bearings, a pair of bunks and a frame fixedly connecting said bunks to hold them separated, said bunk connecting frame having complemental pivot parts engaging those carried by the supporting frame to permit the bunks swinging horizontally, the side frame of the supporting frame and the bunks having surfaces engaging to form side bearings.

Signed at Seattle, King County, Washington this 21st day of December 1920.

FRANK T. FALCO.